Sept. 13, 1938.    R. PLATT-HEPWORTH    2,130,010
SOUND AND PICTURE REPRODUCING APPARATUS
Filed Aug. 15, 1935
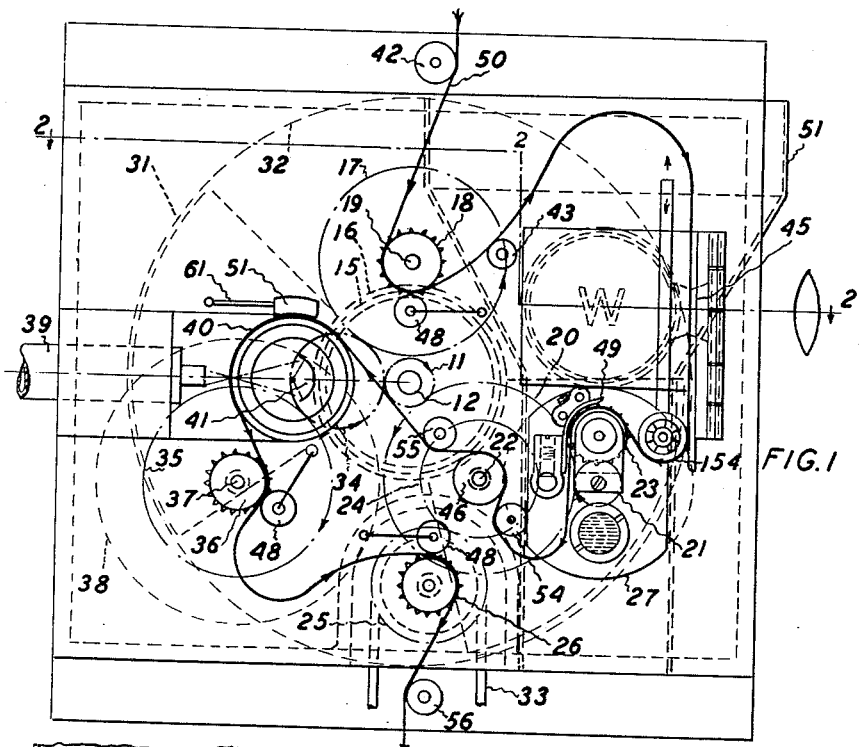
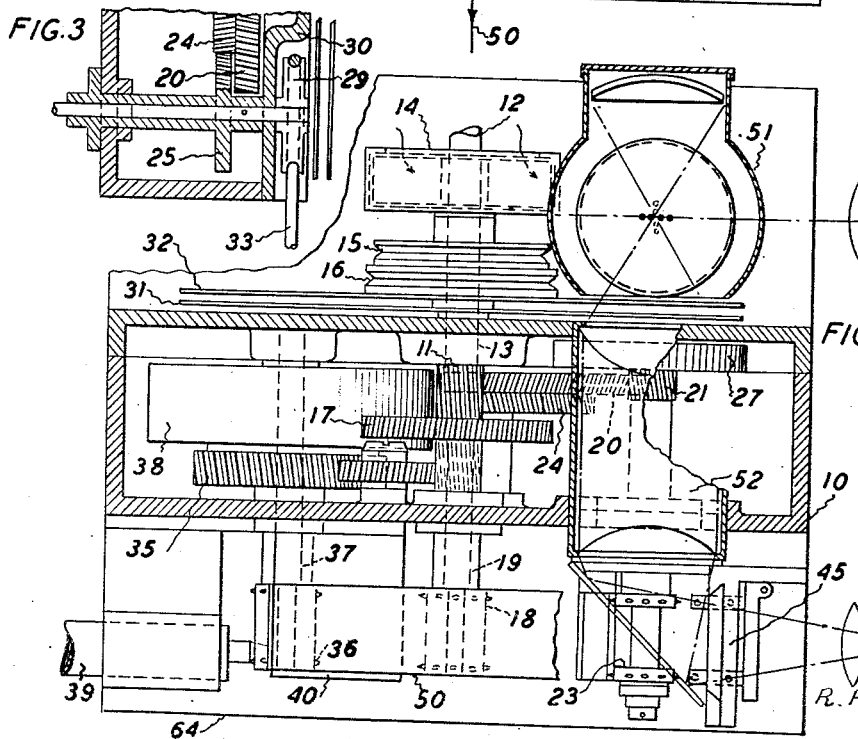
R. Platt-Hepworth
INVENTOR
By Glascock Downing & Seebold
Attys.

UNITED STATES PATENT OFFICE 2,130,010

SOUND AND PICTURE REPRODUCING APPARATUS

Robert Platt-Hepworth, Paddington, near Sydney, Australia

Application August 15, 1935, Serial No. 36,442
In Australia August 30, 1934

4 Claims. (Cl. 88—16.2)

This invention relates to a combined sound and motion picture projector, designed with a view to securing compactness, simplicity, and high mechanical efficiency, particularly as a result of the novel gearing train principle employed. It will be seen that the design makes possible a light shutter system occupying substantially the whole of the side area of the projector. This arrangement results in efficient light interruption because of the large shutter, and effective heat dissipation due to the area of the shutter as well as to the fact that the shutter system is disposed between the radiant source and the film. The shutter system is unobtrusive and is so disposed as to render injury to the operator unlikely.

In a machine embodying the present invention the primary or power shaft is located substantially in the centre of the housing or frame. Around this central drive shaft, and meshing with a pinion on it are grouped the several gears required for operation of the members effecting the propulsion of the film throughout its path. The gearing arrangement allows of effective accommodation of the light tube for the passage of the beam from its source to an orientation mirror or reflector by which the beam is deflected so that it strikes the picture gate. Thence it passes to the objective and on to the screen.

These high speed assemblies, which may be belt or direct motor driven, possess a high degree of momentum or inertia due to the flywheel and shutter system weight. Another advantage is that because of the high speed of the fly wheel relatively to the sprocket shaft speed, a much smaller and lighter fly wheel can be used than would be necessary if the fly wheel ran at sprocket speed, in the conventional way. The several sprocket gears are driven by the pinion of the high speed assembly; these gears are staggered with the object of providing each gear with its own working face on the pinion.

Since there is no connection existing between these sprocket gears except through the high speed driving shaft and pinion, any disturbances or torque irregularities emanating from the fluctuating zones such as the picture or intermittent zone, and feed and take-up zones, must upset or disturb the momentum of the high speed assembly before any such disturbance can react unfavourably to the sound or constant speed zone. The mechanism of the sound zone is therefore practically isolated from the influences tending to disturb its regularity. Zonal isolation of the mechanism of the several film driving zones, and the independent driving of these several mechanisms is the dominant feature of the invention, to which its other features are subordinate or accessory. Therefore, in the practical expression of my principle I do not limit myself to the one represented by the drawing, as the whole object of my invention is to bring about effective isolation of the several film transporting zones from one another.

My arrangement permits the use of a shutter of sufficient diameter to cover the full side area of the projector casing; such a shutter by reason of its diameter ensures a clear cut-off of light at large and full aperture and a full area light beam and good cooling. A fly vane steadying fan is fitted optionally on the overhung end of the primary shaft, and is utilized to create an air blast for maintaining a cool condition about the lamp house and the condenser cell through which the light beam passes to a reflector or a prism and thence to the picture gate.

The lamp house is supported on a pivot base and may be swung round thereon to direct the light beam towards the screen thus to enable it to be used for lantern slide projection.

In the accompanying drawing:—

Fig. 1 is a side elevation of the projector;

Fig. 2 is an interior plan view of the projector; and

Fig. 3 is a fragmentary section through the casing, showing the recessed casing and drive to the take up spool.

10 is a housing of narrow box section with bearing holes formed in its sides for the spindles which carry gears and sprockets. 12 is the primary drive spindle; it is extended through the rear side of the housing at 13 and carries a pulley fly wheel 15—16 and the rotor of an air blower 14 on the overhanging end of it. An electric motor may be direct coupled to this spindle or it may be belt driven, the smaller diameter groove (15) carrying the belt for sound speed drive and the larger diameter groove (16) carrying the belt for silent speed drive. 15—16 may be grooved pulleys, in which case a separate fly wheel is fitted.

A primary drive pinion 11, which is fixed on the spindle 12 drives three toothed wheels (17, 20 and 34) which are grouped around it thereby opposing the cross-wise thrusts and ensuring steadiness. The wheel 17 and a sprocket 18 are both keyed to a spindle 19. The wheel 20 drives the intermittent sprocket 23 through the cam shaft pinion 21 (which carries a fly wheel 27). The intermittent gear is preferably a "Geneva cross" device which is a common element in picture projectors. A transfer gear wheel 24 which is fixed on the side of the wheel 20 drives the wheel 25 which is fixed on the spindle of the film take-up sprocket 26. 29 is a pulley which drives the take-up film spool (not shown) through a belt 33.

The safety shutter 32 and the cut-off shutter 31 are both carried on the overhung end of the spindle 12 between the fly wheel 15—16 and the rear side of the housing 10. These shutters cover the full height of the housing (see dotted circle in Fig. 1) and because of their large area and high peripheral speed and large area apertures they ensure clean and quick opening and cutting of the light beam from the lamp house 51 and rapidly radiate heat absorbed from the lamp rays. The lamp house is carried on a pivot base on a bracket and may be swung round on this base to direct the lamp rays through the condenser cell 52 to the prism or flat reflector by which they are diverted forwardly through the picture gate 45. To provide for the shutters being disposed closely behind the rear wall of the housing that wall is set back as shown in Fig. 3 to form a pocket 30 to accommodate the pulley 29.

The third drive from the primary pinion 11 is applied through the wheel 34 to a gear wheel 35 on the spindle 37 which carries the sound sprocket 36 and a fly wheel 38.

The sound assembly includes an exciter lamp behind the optical tube 39 and a cylindrical box containing the photo-electric cell 41. 40 is the film sound gate box.

The film 50 entering over the guide roller 42 passes round the film feed sprocket 18 on which it is held meshed by an idler roller 48 and thence goes over a free guide roller 43 and curves forwardly and downwardly in an erect loop to its entry through the top of the picture gate 45. The film emerges at the bottom of the gate 45 and passes under the framing roller 154 to the intermittent sprocket 23 on which it is held in mesh by a shoe or roller 49 and thence in a pendent loop goes up over a smooth face roller 46 which is fixed on the spindle 22 of the wheel 20, being frictionally influenced thereon by the idle rollers 54—55, and thence over the cylindrical face of the photo-electric cell box 40. As it passes over the light slit in the side of the box 40 it controls the passage of light rays from the optical exciter system 39 to the photo-electric cell. From this point it goes round a segment of the sprocket 36 on which it is held meshed by idler 48 and then passes in a pendent loop to the take-up sprocket 26 on which it is held meshed by the idler 48. From the sprocket 26 it goes over the guide roller 56 to the take-up spool (not shown) below.

The diameter of the roller 46 is determined so that its peripheral speed will be slightly less than the delivery speed of the sprockets in order that it will constrain the film reversely and assist in holding it tensioned as it approaches the sound gate. An additional impedance device may be fitted to provide appropriate tension on the film during its course to and over the sound gate. This impedance device is a shoe 51 carried on a flexible adjustable arm 61 and bearing down on the film margins. To prevent risk of scratching the film two thin steel strips are fixed externally to the box 40 spaced apart to form supports for the film margins thus to hold the film face a few thousandths of an inch clear from the box surface. The impedance shoe 51 bears on the film where it is supported by these strips, and operates to hold the film tensioned against the pull of the sprocket 36 ensuring flatness in its passage over the sound gate.

The condenser tube 52 through which light rays pass from the lamp house 51 (in alignment with it) is sufficiently above the spindle 12 to allow clearance for the lamp house to be swung round to direct the light rays forward when it is required to utilize the machine for projection with lantern slides.

The wheels are toothed "spirally" and the angles are chosen so that a side thrust is applied to the fly wheel 38 influencing it towards the housing side and thus imposing frictional resistance proportional to the reaction of the drive, whereby steadiness of drive is obtained as the frictional resistance rises when speed of drive is increased.

The whole of the gearing is enclosed in the housing 10, and the film and its sprocket and roller assembly and the gates are protected in the near side by casing 64. The load on the primary drive pinion 11 is cross balanced by the grouping of the driven wheels around it, and a compact arrangement of the gearing in which the gears are disposed in staggered arrangement permitting of a separate tooth face for each gear plane within the housing, and enabling reduction of the overall dimensions of the machine very substantially. Access to the gearing assembly is obtainable by drawing the rear side cover off the housing without interfering with any part of the equipment which is contained in the film assembly casing on the near side of the machine.

What I claim as my invention and desire to secure by Letters Patent is:—

1. A motion picture projector including a sound unit, a primary drive shaft, a housing receiving said shaft centrally thereof, a fly wheel, cut-off shutter and pinion carried by said drive shaft, three gear wheels disposed about said pinion and in mesh therewith, a continuous film feed sprocket driven by the first of the three gear wheels, a sound wheel sprocket driven by the second gear wheel, an intermittent sprocket and a take-up sprocket, said intermittent sprocket and take-up sprocket being driven by the third gear wheel and said sprockets being located laterally of the plane of the drive shaft spindle.

2. A motion picture projector as claimed in claim 1, in which the cut-off shutter covers substantially the full dimensions of the housing side, the picture projector lamp house being located on the same side of the housing and spaced therefrom, and a pulley adapted to provide driving means for taking up the film inset in a pocket in the housing to provide clearance for the shutter rotation.

3. A motion picture projector as claimed in claim 1, in which a film tensioning drum is associated with the housing and driven by one of said gears at a peripheral speed different from that at which the film driving sprockets are driven.

4. A motion picture projector according to claim 1 wherein the gear wheels meshing with the drive pinion on the primary shaft are provided with spiral teeth, with the angular teeth disposed in relation to the direction of drive so as to influence a fly wheel axially towards frictional contact with the wall of the housing and thereby procure brake action proportional to the driving reaction.

ROBERT PLATT-HEPWORTH.